May 31, 1932.    E. H. SORENSEN    1,860,844
ASSEMBLING APPARATUS
Filed Sept. 10, 1930    2 Sheets-Sheet 1
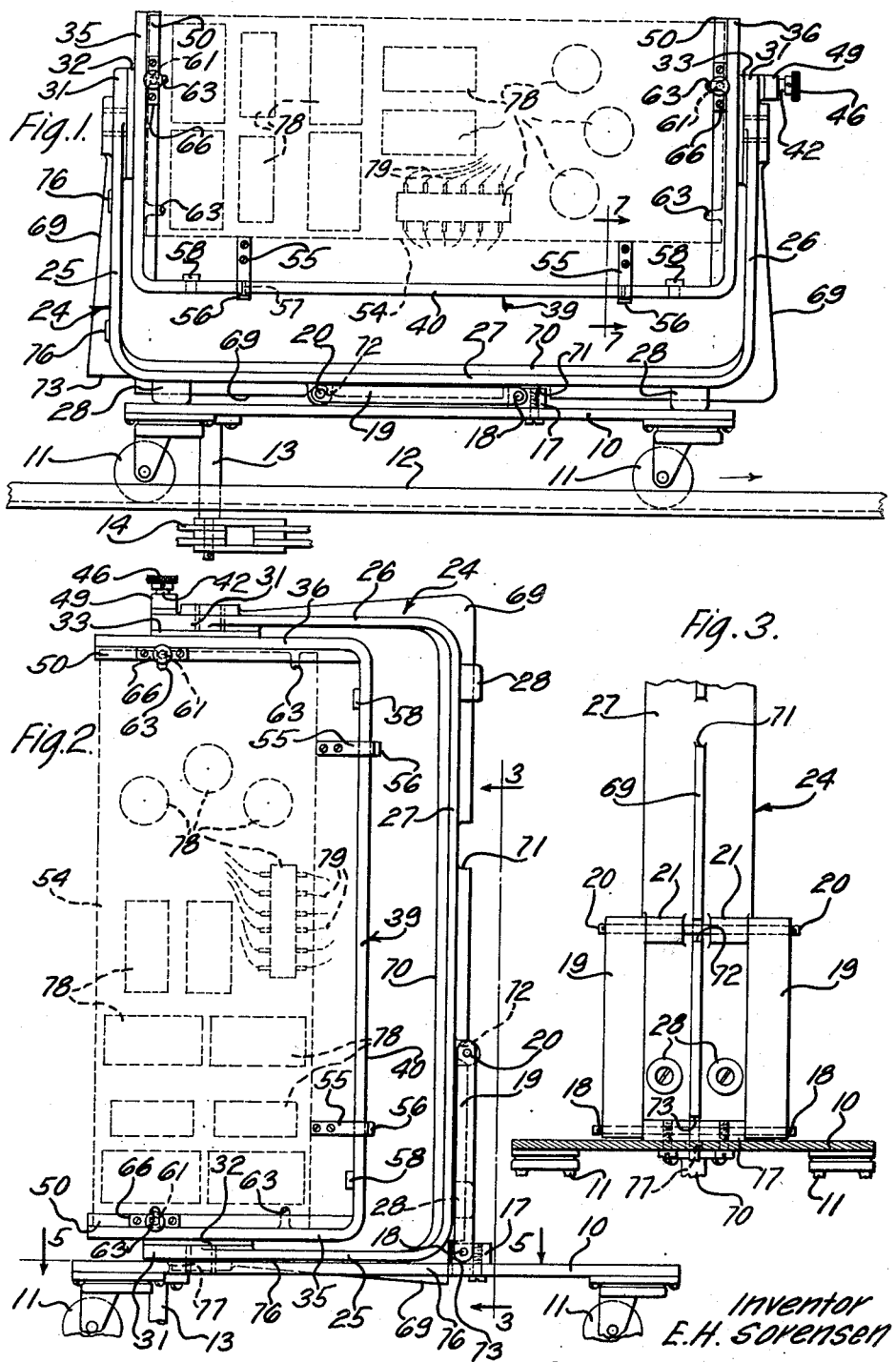
Inventor
E. H. Sorensen

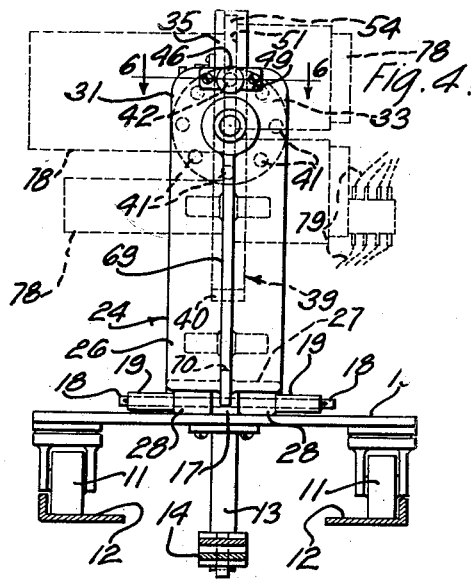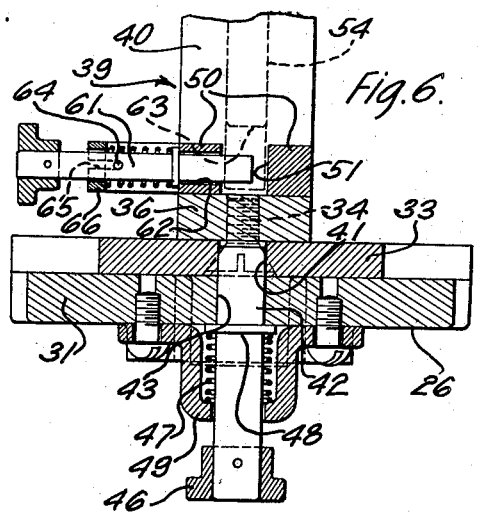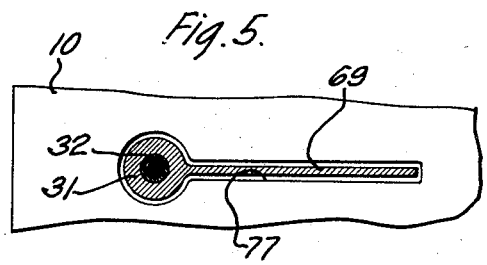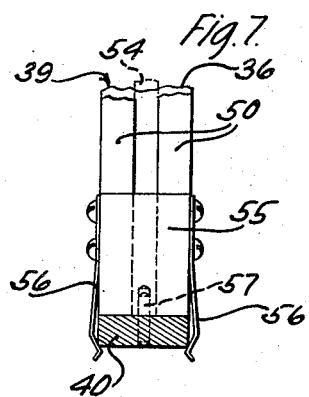

Patented May 31, 1932

1,860,844

UNITED STATES PATENT OFFICE

EARL H. SORENSEN, OF CHICAGO, ILLINOIS, ASSIGNOR TO WESTERN ELECTRIC COMPANY, INCORPORATED, OF NEW YORK, N. Y., A CORPORATION OF NEW YORK

ASSEMBLING APPARATUS

Application filed September 10, 1930. Serial No. 481,019.

This invention relates to assembling apparatus, and more particularly to adjustable assembling apparatus.

The primary object of this invention is to provide an improved apparatus designed to facilitate and expedite the assembling of articles.

In accordance with the general features of this invention there is provided in one embodiment thereof, as applied to the assembling and handling of telephonic apparatus, an apparatus comprising a movable carrier or table having hinged thereon a U-shaped frame movable in a single plane to different positions. Rotatably mounted between the parallel arms of the hinged U-shaped frame is a second U-shaped frame to which is clamped a member upon which articles are to be assembled or handled. Means is provided for locking the second U-shaped frame in a plurality of angular positions relative to the hinged, U-shaped frame in its different positions upon the table.

Other objects and advantages of this invention will more fully appear from the following detailed description, taken in connection with the accompanying drawings, wherein Fig. 1 is an elevation of an assembling apparatus embodying the features of this invention shown in connection with a line or progressive assembly system;

Fig. 2 is a fragmentary view similar to Fig. 1 but with the hinged portion of the apparatus moved from a horizontal to a vertical position;

Fig. 3 is a fragmentary vertical section taken on the line 3—3 of Fig. 2;

Fig. 4 is an end view of Fig. 1, looking at the right end thereof;

Fig. 5 is a plan detail section taken on the line 5—5 of Fig. 2;

Fig. 6 is an enlarged plan detail section taken on the line 6—6 of Fig. 4, and

Fig. 7 is a vertical detail section taken on the line 7—7 of Fig. 1.

Referring now to the drawings, and particularly to Figs. 1, 2, and 3, a carrier or moving table is indicated a 10 provided with casters 11 which ride upon rails 12. A lug 13 is fixed to the underside of the table 10 with its lower end secured to a continuously moving chain 14 of an endless conveyor system, shown fragmentarily. Although in the drawings only one table 10 carrying the assembling apparatus or fixture to be presently described is illustrated, in practice where the endless conveyor system is used for progressive assembly of articles upon a member an endless chain of the tables 10 with the assembling apparatus thereon will be attached to the chain 14. Fixed to the top of the table 10 adjacent its right end and positioned transversely thereof (Fig. 1) is a rectangular block 17, to opposite ends of which (Figs. 2 and 3) are pivoted, as indicated at 18, the ends of links 19, the opposite ends of the links being pivoted as indicated at 20 to a pair of spaced lugs 21 integrally formed on an outer U-shaped frame 24, the links with their pivotal connections providing a hinge between the table 10 and the frame 24, the frame being movable in a single plane relative to the table. The frame 24 comprises parallel arms 25 and 26 connected together by an arm 27 which carries the lugs 21. In the horizontal position of the frame 24, as shown in Fig. 1, the arm 27 is parallelly spaced from the table 10 by pairs of rubber spacing and snubbing blocks or feet 28 secured to the arm at each end thereof. The upper ends of the arms 25 and 26 of the frame 24, as viewed in Fig. 1, are formed with apertured bearing portions 31 in which is journaled reduced ends of shouldered discs 32 and 33 associated with the arms 25 and 26, respectively, the annular faces of the larger ends of the discs surrounding the reduced ends thereof fitting closely the adjacent faces of the bearing portions 31 of the arms 25 and 26.

The discs 32 and 33 upon their faces opposite the annular faces thereof are fixed by screws 34 to parallel arms 35 and 36, respectively, of a second U-shaped frame 39, which arms are connected together by an arm 40, one of the screws 34 being indicated in dotted outline in Fig. 6. Formed concentrically about the axis of the disc 33 in the larger end thereof are a plurality of equally spaced apertures 41, which may be registered one at a time with a spring pressed pin 42 (Fig. 6) mounted in an aperture 43 in the bearing portion 31 of the arm 26 of the frame 24, the pin being equipped at its outer end with a hand knob 46. A compression spring 47 surrounds the pin 42, opposite ends of the spring engaging a shoulder 48 upon the pin and the inner surface of a bracket 49 fixed to the bearing portion 31, the shoulder 48 abutting the outer face of the bearing portion when the pin 42 is in one of the apertures 41 of the disc 33. It will be apparent that by withdrawing the pin 42 against the action of the spring 47 from the aligned aperture 41 of the inner U-shaped frame 39, the latter may be rotated upon the outer U-shaped frame 24 to a plurality of angular positions, and when rotated to the position desired the pin 42 is released to enter the aligned aperture 41 to lock the inner U-shaped frame in the desired position. Although the apertures 41 are equally spaced it will be readily understood that they may be differently spaced, according to the particular character of the operations to be performed.

Fixed to the inner faces of each of the arms 35 and 36 of the inner U-shaped frame 39 are a pair of parallel spaced strips 50 providing opposed channels 51 in the arms 35 and 36 (Fig. 6) for the reception of opposite ends of a member 54 upon which articles are to be assembled or handled, shown in dotted outline in the drawings. At its lower end (Figs. 1 and 7) the member 54 rests upon a pair of blocks 55, each removably secured to the arm 40 of the inner U-shaped frame 39 by a pair of leaf springs 56 fixed to opposite sides of the block and engaging the side faces of the arm 40. A pin 57 carried by the block 55 with its lower projecting end inserted in an aperture of the arm 40 serves to position the block longitudinally of the arm. When another member 54 having a greater depth, as viewed in Fig. 1, is to be mounted on the inner U-shaped frame 39, the blocks 55 are removed and the lower end surface of the member 54 then rests upon pins 58 fixed to the arm 40. A spring pressed pin 61 is associated with each of the arms 35 and 36 of the inner U-shaped frame 39, as shown in Figs. 1, 2, and 6. The pins 61 and the mounting thereof are substantially similar to the pin 42 hereinbefore described. Inner ends of the pins 61 extend through apertures 62 (Fig. 6) in the forward strips 50, as viewed in Fig. 1, and into slots 63 formed in the ends of the member 54, the slots 63 also being used in the final mounting of the particular telephonic apparatus in a telephone exchange. A laterally extending pin 64 is fixed to the pin 61 which may be drawn through a slot 65 (dotted outline Fig. 6) in a supporting bracket 66 for the pin 61, and then by rotating the pin 61 the pin 64 carried thereby may be displaced from the slot 65; thereafter when the pin 61 is released, the pin 64 will engage the outer surface of the bracket 66 and the inner end of the pin 61 will be positioned outside of the slot 63 in the member 54. The spring pressed pins 61 in cooperation with the slots 63 of the members 54 serve to lock the latter to the inner U-shaped frame 39 and when removing or replacing the member 54 the pins may be held out of the slots 63 by means of the pins 61 in the manner described.

A central strengthening web 69 extends along the outer surfaces of the arms 25, 27, and 26 of the outer U-shaped frame 24, and a web 70 along the inner surface of the arm 27 (Figs. 1 and 4). The outer web 69 is notched as shown at 71 and 72 to clear the block 17 and the pin of the pivot 20 when the outer U-shaped frame 24 is positioned horizontal, as shown in Figs. 1 and 4. A notch 73 is also formed in the outer web 69 at the junction of the arms 25 and 27, which when the outer U-shaped frame 24 is positioned vertically, as shown in Fig. 2, permits the web to clear the block 17. Formed upon the arm 25 of the frame 24 at either side of the web 69 thereof and adjacent each end of the arm are raised lug portions 76 which engage the upper surface of the table 10 when the frame is vertically positioned. The web 69 and an outer reduced annular portion of the bearing 31 when the frame 24 is positioned vertically extend into a slot 77 (Fig. 5) formed in the table 10.

In using an endless conveyor system equipped with the herein described assembling apparatus for progressive assembly of articles upon a member where several operators perform successive assembly operations or adjustments on the same piece or unit of apparatus the member 54 upon which the articles are to be assembled will first be mounted on and secured to the inner U-shaped frame 39 of the assembling apparatus in the manner hereinbefore described, as the carrier or table 10 travels in the direction of the arrow (Fig. 1). At different stations along the system the operators who may be positioned outside of the endless chain of tables 10 assemble on the member 54 various articles 78, some of which are fixed to one side of the member 54 and others to the opposite side thereof (Fig. 4). In the mounting and securing of certain of the articles 78 in the different positions upon each side of the member 54 these operations may be more readily accomplished by having the U-shaped frames positioned as shown in Figs. 1 and 4, and in which position it will be apparent that the inner U-shaped frame 39 may be released, rotated to one of a plurality of angular positions relative to the outer U-shaped frame 24, and locked thereat, whichever is more convenient for the particular assembling operation being performed. In the case of other of the articles 78 these operations may be accomplished in a more facile manner by turning the outer U-shaped frame 24 carrying the inner frame 39 up on its end to a vertical position as shown in Figs. 2 and 3. One of the articles 78 is shown with conductors 79 extending therefrom, which are soldered to terminals (not shown) of certain of the other articles 78, and to perform this operation efficiently the last mentioned position of the frames 24 and 39 is desirable. To move the assembling apparatus to this latter position, the operator grasps the arms 25 and 26 of the frame 24 (Fig. 1) and lifts upwardly, at the same time swinging the frame 24 about the pivot 20, between the frame and the link 19, in a counterclockwise direction, the links 19 at this time turning about the pivot 18 in clockwise direction. This movement of the frame 24 brings the lug portions 76 upon the arm 25 into engagement with the upper surface of the table 10 where the assembling apparatus with or without the member 54 thereon, will rest of its own weight in a vertical position. The notch 73 in the web 69 at this time fits around the corner of the block 17 and the web 69 and the outer reduced portion of the bearing 31 of the arm 25 is positioned in the slot 77 of the table 10. In the vertical position of the frames 24 and 39 certain of the assembling operations may be facilitated by rotating the inner frame 39 in the manner hereinbefore described upon the frame 24 and setting it at various angles.

Although this invention is illustrated and described as applied to a progressive assembly system employing an endless conveyor with a particular type of apparatus shown thereon for assembly, it is clear that it may also be used on a fixed bench or other support and may have a very general application, and the invention is only to be limited by the spirit and scope of the appended claims.

What is claimed is:

1. In an assembling apparatus, a base, a member hinged to the base for movement to a plurality of positions, the member arranged to rest by gravity in each position thereof against a single surface of the base, and a second member movable on the first member for supporting in a plurality of positions a member upon which articles are to be assembled.

2. In an assembling apparatus, a base, a member pivoted to the base for movement in a single plane to a plurality of positions, the member arranged to rest by gravity in each position thereof against a single surface of the base and upon surfaces of the member disposed at right angles, and a second member movable on the first member in all positions thereof for supporting in a plurality of positions a member upon which articles are to be assembled.

3. In an assembling apparatus, a base, a member pivoted to the base for movement in a single plane to a plurality of positions, the member arranged to rest by gravity in each position thereof against a single surface of the base and upon surfaces of the member disposed at right angles, and a second member pivotally mounted on the first member and capable of complete rotation in all positions thereof for supporting in a plurality of positions a member upon which articles are to be assembled.

4. In an assembling apparatus, a base, a plurality of U-shaped members, one of the members rotatably mounted between opposed portions of the other for supporting a member upon which articles are to be assembled in a plurality of positions, and means connecting the other member and the base adapted to permit movement in a single plane to vertical and horizontal positions of the latter member, said member engaging in each of said positions a single surface of the base.

5. In an assembling apparatus, a base, a frame comprising spaced arms and a connecting arm therebetween, a hinge connection between the connecting arm and the base for permitting movement of the frame in a single plane to vertical and horizontal positions, said frame engaging in each of said positions a single surface of the base, and a member rotatably mounted on and between the spaced arms of the frame for supporting a member upon which articles are to be assembled in a plurality of positions.

6. In an assembling apparatus, a base, a U-shaped member hinged to the base for movement to a plurality of positions, a second U-shaped member rotatably mounted on and between opposed portions of the first member for supporting a member upon which articles are to be assembled in a plurality of positions, and means carried by the opposed portions of the second member and on a portion interconnecting the same for supporting in a predetermined position therebetween one side of a member upon which articles are to be assembled, the means carried on the interconnecting portion designed to be readily removed to permit another size of member to be supported.

7. In an assembling apparatus, a base, a U-shaped member, means connecting the member to the base arranged to permit movement of the member in a single plane to vertical and horizontal positions, said member engaging in each of said positions a single surface of the base, a member pivotally mounted on and between parallel arms of the U-shaped members and capable of complete rotation in either position of the U-shaped member for supporting a member upon which articles are to be assembled in a plurality of positions, and means carried by the U-shaped member and cooperating with the member pivoted thereon for holding the latter member in a predetermined angular position.

8. In an assembling apparatus, a base, a frame comprising spaced arms and a connecting arms therebetween, links pivotally connected at opposite ends to the base and the connecting arm of the frame, supporting blocks carried on the lower face of the connecting arm adjacent each end for spacing the frame from the base in one position of the frame on the base with the links parallel to and between the connecting arm and the base, spaced supporting lugs on the outer face of one of the spaced arms of the frame upon which the latter rests against the base when the frame is turned up on its end in another position thereof, and a member rotatably mounted on and between the spaced arms of the frame for supporting a member upon which articles are to be assembled in a plurality of positions in each position of the frame.

9. In an assembling apparatus, a carrier, means for continuously moving the carrier along a predetermined path, a member hinged to the carrier for movement to a plurality of positions, and a second member movable on the first member for supporting a member upon which articles are to be assembled in a plurality of positions while the carrier moves along the path.

10. In an assembling apparatus, a carrier, means for continuously moving the carrier along a predetermined horizontal path, a member pivoted to the carrier upon a horizontal axis for movement in a single plane to a plurality of positions, and a second member rotatably mounted on the first member for movement in all positions thereof about its horizontal axis for supporting a member upon which articles are to be assembled in a plurality of positions while the carrier moves along the path.

11. In an assembling apparatus, a base, a plurality of pivotally connected members, one of the members mounted to rotate between opposed portions of the other member for supporting an element upon which articles are to be assembled in a plurality of positions, and means connecting the other member with the base for preventing displacement thereof relative to the base and adapted to permit the movement thereof to horizontal and vertical positions, said last mentioned member resting by gravity in each of said positions against a single surface of the base.

In witness whereof, I hereunto subscribe my name this 22nd day of August, A. D. 1930.

EARL H. SORENSEN.